(12) United States Patent
Watson et al.

(10) Patent No.: US 7,421,709 B2
(45) Date of Patent: Sep. 2, 2008

(54) FRAMEWORK FOR ADAPTER USED IN ENTERPRISE APPLICATION INTEGRATION

(75) Inventors: Dave Watson, Atlantic Highlands, NJ (US); Marc J. Greenberg, Merrick, NY (US)

(73) Assignee: Information Builders, Inc., New York, NY (US)

(*) Notice: Subject to any disclaimer, the term of this patent is extended or adjusted under 35 U.S.C. 154(b) by 582 days.

(21) Appl. No.: 11/028,921

(22) Filed: Jan. 4, 2005

(65) Prior Publication Data

US 2005/0149941 A1 Jul. 7, 2005

Related U.S. Application Data

(60) Provisional application No. 60/534,320, filed on Jan. 5, 2004.

(51) Int. Cl.
*G06F 3/00* (2006.01)
*G06F 9/44* (2006.01)
*G06F 9/46* (2006.01)
*G06F 13/00* (2006.01)

(52) U.S. Cl. .................................................... 719/320

(58) Field of Classification Search .................. 719/320
See application file for complete search history.

(56) References Cited

U.S. PATENT DOCUMENTS

| | | | |
|---|---|---|---|
| 6,308,178 B1* | 10/2001 | Chang et al. | 707/100 |
| 7,096,267 B2* | 8/2006 | Lansio et al. | 709/227 |
| 2001/0047427 A1* | 11/2001 | Lansio et al. | 709/238 |
| 2003/0093402 A1* | 5/2003 | Upton | 707/1 |
| 2003/0093470 A1* | 5/2003 | Upton | 709/203 |
| 2004/0064503 A1* | 4/2004 | Karakashian et al. | 709/203 |
| 2005/0099995 A1* | 5/2005 | Blossom et al. | 370/352 |

* cited by examiner

*Primary Examiner*—Meng-Ai An
*Assistant Examiner*—KimbleAnn Verdi
(74) *Attorney, Agent, or Firm*—Levine & Mandelbaum

(57) ABSTRACT

A method of making adapters for enabling incompatible computer systems to work in cooperation by providing a framework of software rules and resources from which to configure adapters for mediating between incompatible applications. The adapters are each provided with at least one interface for receiving requests and another interface for sending information. The framework resources and rules provide objects which can be reused for making one-way adapters, bi-directional adapters, round-trip adapters, and compound adapters.

37 Claims, 7 Drawing Sheets

A Pair of One-way Interactions

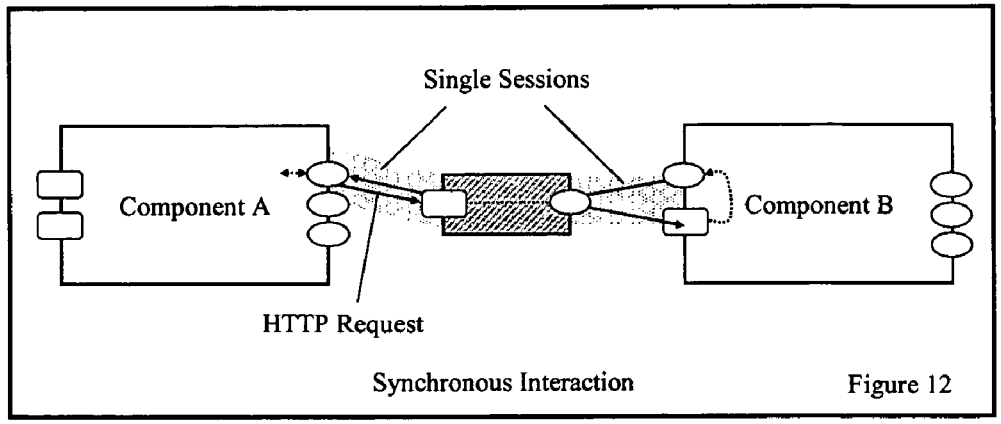
Synchronous Interaction     Figure 12
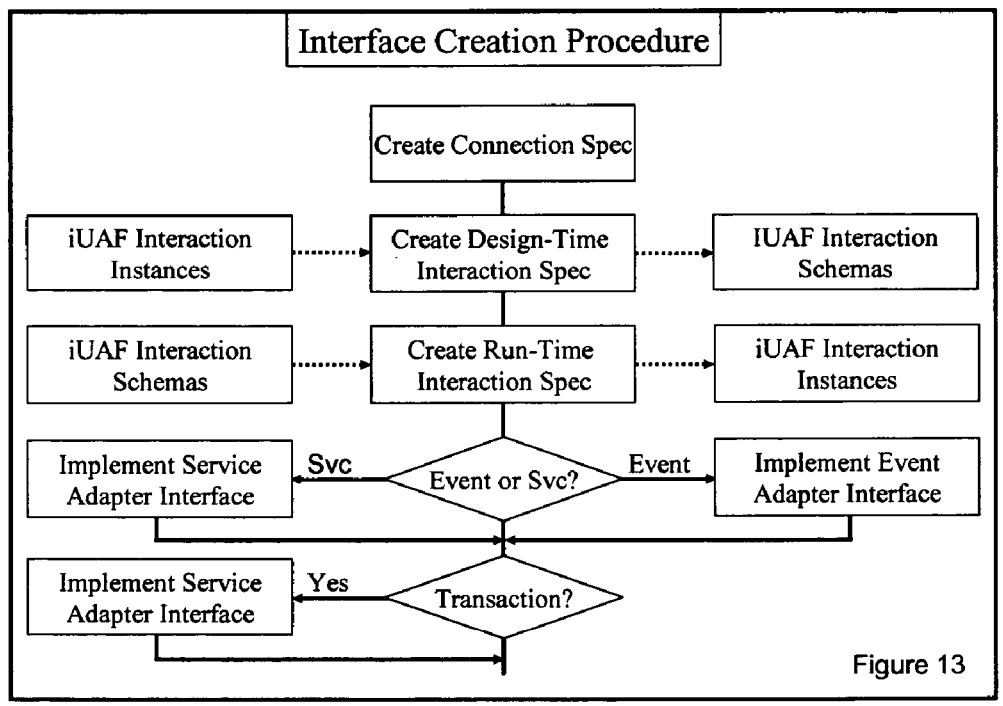
Figure 13

FRAMEWORK FOR ADAPTER USED IN ENTERPRISE APPLICATION INTEGRATION

BACKGROUND OF THE INVENTION

The present invention is directed to the integration of heretofore fragmented computer application systems, and for enabling incompatible application systems to function smoothly as a unit. More specifically, the present invention provides a framework for enhancing enterprise application integration, a software engineering discipline that addresses the problem of application interoperability. The goal of Enterprise Application Integration is to transform a mutually incompatible, networked collection of applications into a working system without changing the applications themselves. That is, the purpose of Enterprise application integration (EAI) is to turn arbitrary collections of isolated applications into working systems.

A need for enabling incompatible computer systems to work in cooperation often results from the merger of two businesses having incompatible computer systems into a single enterprise. The investment in software development and data, and in complex hardware installations, and the time and expense of replacing one of the systems, including its software and data, has created a need for a way to mediate between the incompatible systems in a way that they can work in cooperation.

A computer system is a dynamically changing collection of cooperating components. Each component constitutes an identifiable programmed entity having an external interface for communicating with other components. A component that performs a well-defined business function and is designed to work in isolation is referred to as an application.

In the prototypical enterprise application integration scenario, a well-defined class of pre-existing components, namely, applications, perform all of the vital business functions. The remaining components consist of brokers and adapters. Brokers and adapters are present solely to enable the applications to interoperate.

Adapters for performing mediation between two incompatible computer systems are known in the prior art. However, until recently, the construction of an adapter in software has been a time-consuming and expensive process in that each adapter designed to mediate between a unique combination of computer systems has been required to be constructed from scratch.

An adapter must pass messages between incompatible computer systems in a way that makes the messages understandable to both systems. A message is an encoded body of text expressing either a request for services or a response to a request for services. Request messages flow from clients to servers. Response messages flow in the reverse direction. Messages exchanged by cooperating applications often exhibit a deeply nested structure. ebXML messages, for example, contain an optional transport envelope, a message envelope, a header envelope, a payload envelope and, finally, a header and a payload as illustrated in FIG. 18.

A component can broadcast a one-way message, namely, an event, to one or more subscribers, or the component can initiate a request/reply interaction, or engage in a conversational exchange. There are no other methods of application interaction. Any of the above mentioned interactions may be synchronous or asynchronous. In a synchronous interaction, as illustrated in FIG. 12, the receiver processes the message before acknowledging its receipt. In an asynchronous operation, the receiver, acknowledges receipt before doing anything else. The presence of brokers and adapters in a system, even when increasing the complexity of the system, does not alter the basic rules of inter-component engagement.

Referring now to FIG. 1, there is illustrated an adapter. An adapter is a non-invasive component that mediates between otherwise incompatible components, making it possible for them to interoperate. The purpose of Enterprise Application Integration (EAI) is to turn arbitrary collections of isolated applications and other components into working systems. A data adapter provides any heterogeneous mix of data sources with a single, industry standard (e.g., SQL) interface. An application adapter provides any heterogeneous mix of applications with a single, industry standard (e.g., XML) interface.

Adapters sometimes facilitate the introspection of metadata and the publication of standard request-response schemas, i.e. plans or protocols.

A payload consists of essential data carried within an encoded body of text of a message destined either to be processed by a server or digested by a client.

The sole purpose of an adapter is to enable two otherwise incompatible applications to work together. An adapter achieves this objective by mediating between the two applications without affecting the internal operation of either one.

Adapter developers have heretofore had difficulty in addressing large-scale enterprise application integration implementation problems.

SUMMARY OF THE INVENTION

The present invention overcomes the problems of the prior art by providing a developmental and execution environment for adapters in the form of a universal adapter framework or UAF.

The present invention provides a productive design-time environment for developers, and a hospitable run-time environment for production adapters in the form of an adapter framework. The adapter framework hides complexity, sets standards, lays the groundwork for software reuse, supplies services (e.g., message parsing and transformation, protocol handling, adapter composition, security, transactional integrity, management visibility, exception handling, metadata support, etc.) and embraces the wide variety of hardware and software platforms, message transports, formats and types that are encountered in enterprise application integration. As used herein, "adapter framework" refers to a computer environment that fosters both the development and deployment of adapters and supports their execution.

It is an object of the invention to foster software reuse by means of architectural recursion.

Another object of the invention to produce adapters having two interfaces, one for incoming requests, another for outgoing requests.

Still another object of the invention is to support the need for bi-directional adapter interfaces.

A further object of the invention is to produce adapters that opeate in a synchronous or an asynchronous manner.

Still a further object of the invention is to enable software developers to configure communications transports independently of message payloads and headers.

An additional object of the invention is to enable software developers to independently configure request acknowledgements.

Still an additional object of the invention is to enable software developers to independently configure input and output message formats.

A further additional object of the invention is to enable software developers to deploy their adapters to any server.

Other and further objects will be apparent from the following drawings and description of a preferred embodiment of the invention.

DESCRIPTION OF THE DRAWINGS

FIG. 12 is a diagrammatical view of an adapter supporting a synchronous interaction between two components.

FIG. 13 is a flow diagram illustrating the creation of an interface in accordance with the invention.

DESCRIPTION OF THE PREFERRED EMBODIMENT

The universal adapter framework (UAF) of the invention includes a framework component, and three major supporting components, namely, an adapter manager, an XD adapter handler and a shim framework. Source code for the framework component is annexed hereto in Appendix A.

Figure 14:
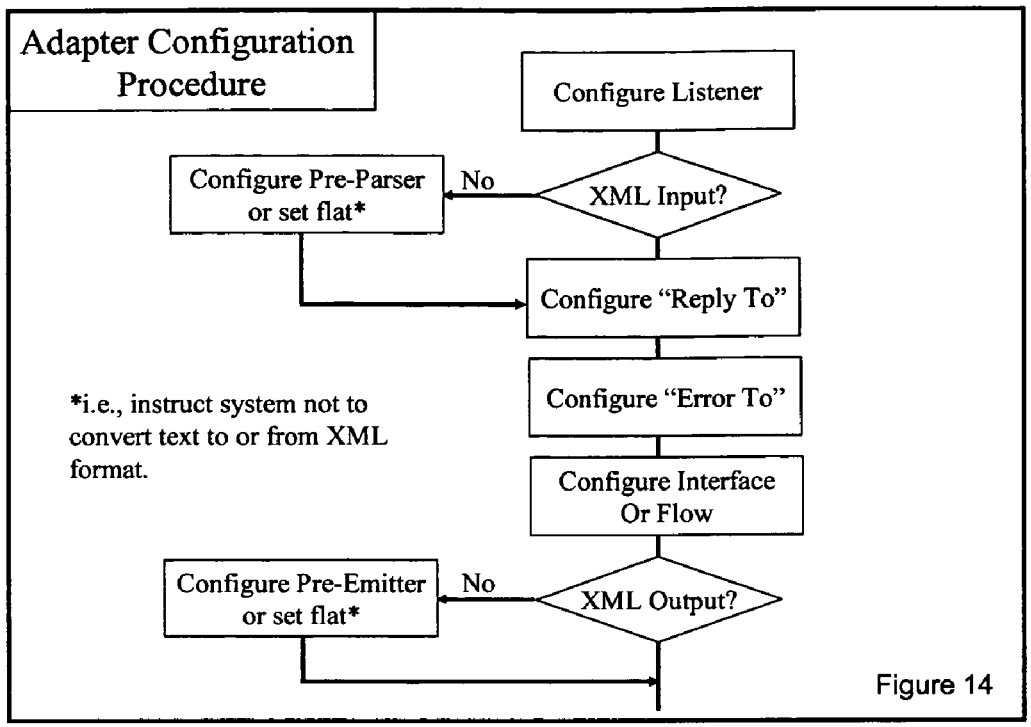
FIG. 14 is a flow diagram illustrating the configuration of an adapter in accordance with the invention.
Figure 15:
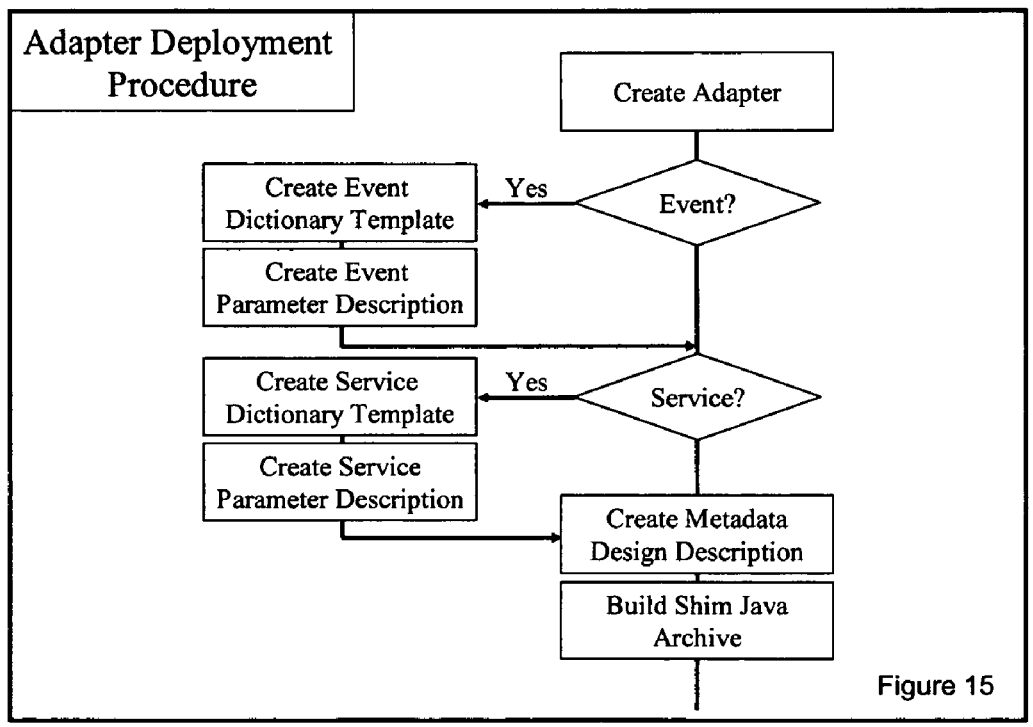
FIG. 15 is a flow diagram illustrating the deployment of an adapter in accordance with the invention.

The UAF of the invention relies on three related processes, namely, interface creation (see FIG. 13), adapter configuration (see FIG. 14) and adapter deployment (see FIG. 15). The framework component provides core services and ensures that that the adapters that run within the UAF conform to a common standard. The UAF enables adapters to run within any integration environment.

An event dispatcher is provided by the framework of the invention to enable an adapter to respond to external events, e.g., the arrival of a message, and to assign incoming messages to worker threads for subsequent processing. Event dispatchers are sensitive to and comply with standard communications protocols.

A service router is provided by the framework of the invention to enable an adapter to formulate a plan of action and supervise the implementation of that plan. Information in the message header and the metadata repository governs the behavior of this component.

A handler is provided by the framework of the invention to enable an adapter to manipulate message payloads, making them comprehensible to their intended recipients.

Figure 2:
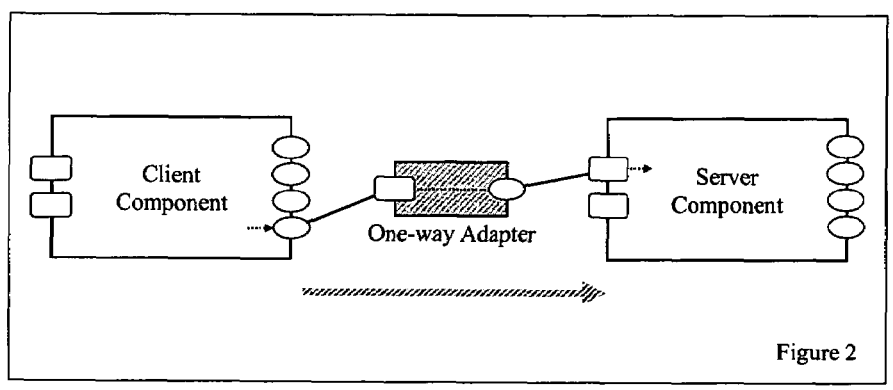
FIG. 2 is a diagrammatical view of a unidirectional adapter.

In FIG. 2 there is shown a unidirectional adapter, i.e., an adapter which works in a single direction. Unidirectional, or one-way adapters, enable an application, commonly referred to as a client, to invoke the services of another application, i.e., a server or a broker. Unidirectional or one-way adapters cannot operate in reverse, i.e., they cannot enable a server or a broker to invoke the services of an application.

The simplest one-way adapters do little more than convert incoming requests into a canonical format and pass their output to a broker. The broker, in turn, routes the resultant requests to a server, sometimes after passing them through one or more additional one-way adapters.

Figure 3:
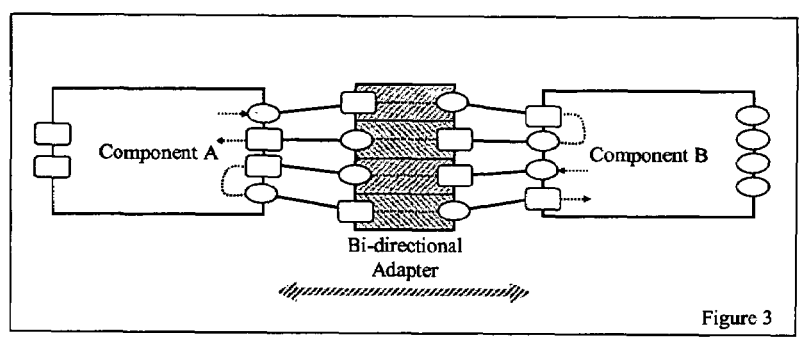
FIG. 3 is a diagrammatical view of a bidirectional adapter.
Figure 4:
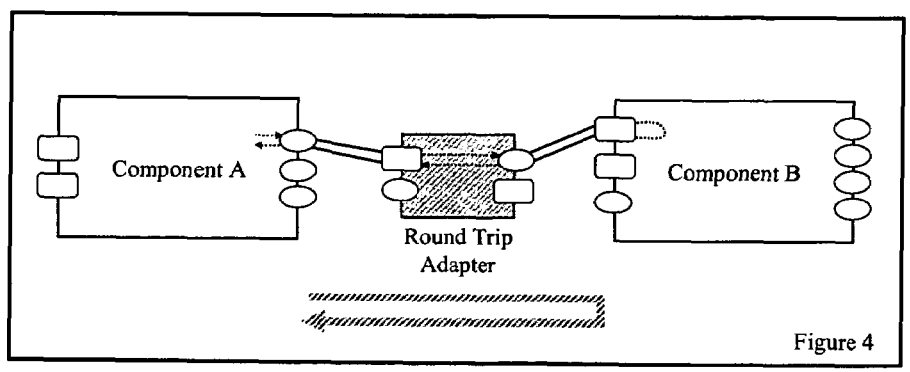
FIG. 4 is a diagrammatical view of a round-trip adapter.
Figure 11:
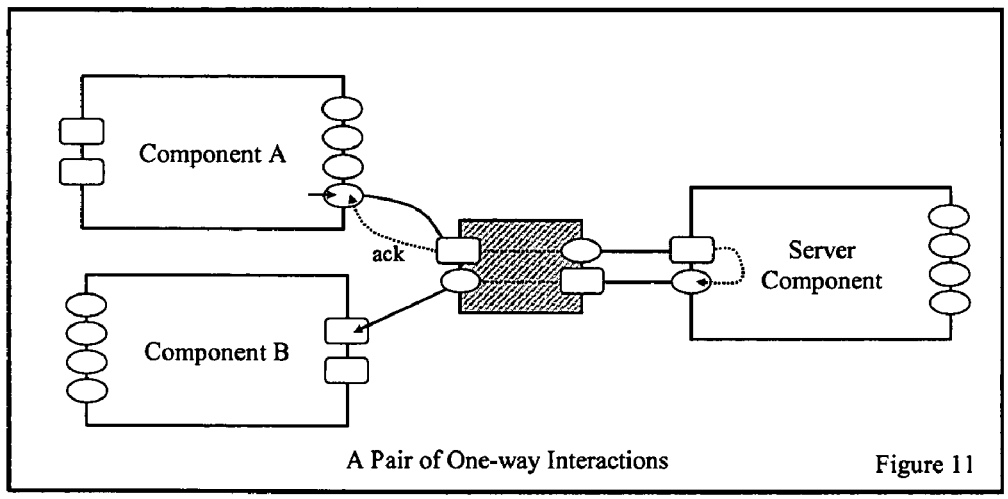
FIG. 11 is a diagrammatical view depicting a pair of unidirectional adapters.

FIG. 4 illustrates another type of adapter, known as a round trip adapter. Round trip adapters make it possible, not only for clients to invoke services, but also for them to receive intelligible responses. In FIG. 3 there is shown a bi-directional adapter which enables symmetric, round-trip application interactions. As can be seen in FIG. 11, two one-way adapters can be combined to enable one component A to request a service for another component B. Round trip adapters may also be monolithic.

Figure 5:
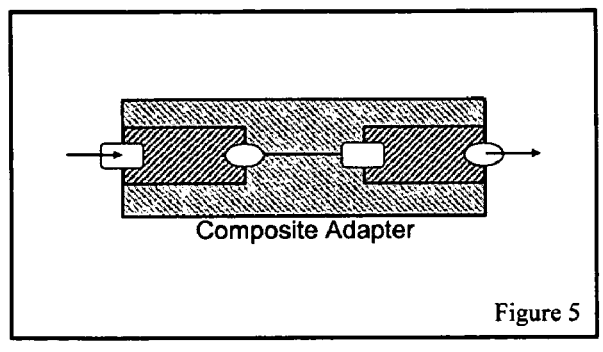
FIG. 5 is a diagrammatical view of a compound adapter.

Round-trip adapters have a more complex structure than unidirectional adapters and symmetric bidirectional adapters have a more complex structure than round trip adapters. In cases where two or more adapters have compatible interfaces, it is possible to create a new adapter by plugging one adapter into another as shown in FIG. 5. This process is known as composition.

Figure 1:
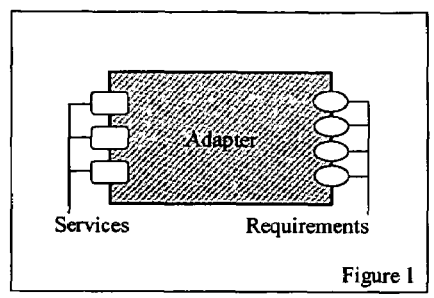
FIG. 1 is a diagrammatical view of an adapter.

An interface is a message protocol for invoking the services of a particular application. As illustrated in FIG. 1, components use one type of interface to provide services and another type of interface to use services. An application must provide at least one interface in order to be suitable for use in enterprise application integration. An adapter must have at least one interface suitable for providing services and one interface suitable for enabling use of services.

An interface consists of a wire transport protocol, a header and a payload. The Open System Connection (OSI) reference model (ISO Model of Architecture for Open Systems Interconnection. IEEE Transactions on Communications, 28(4): 425--432, April 1980) describes seven discrete functional layers of interaction. The model provides a means of understanding how applications communicate over a network. Thus, for example, for an E-mail application, POP/SMTP would typically serve as the application protocol, MIME would serve as the presentation layer, POP/25 as the session layer, and TCP as the transport layer.

Figure 7:
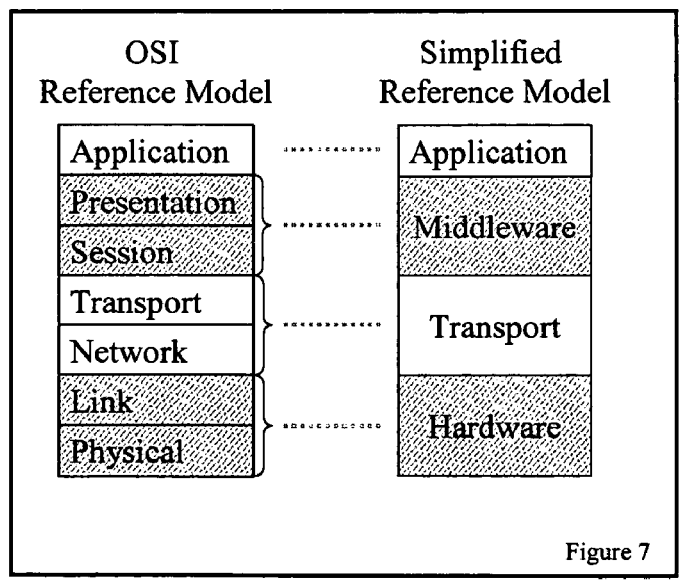
FIG. 7 is a diagrammatical view of a simplified reference model of an architecture for open systems.
Figure 8:
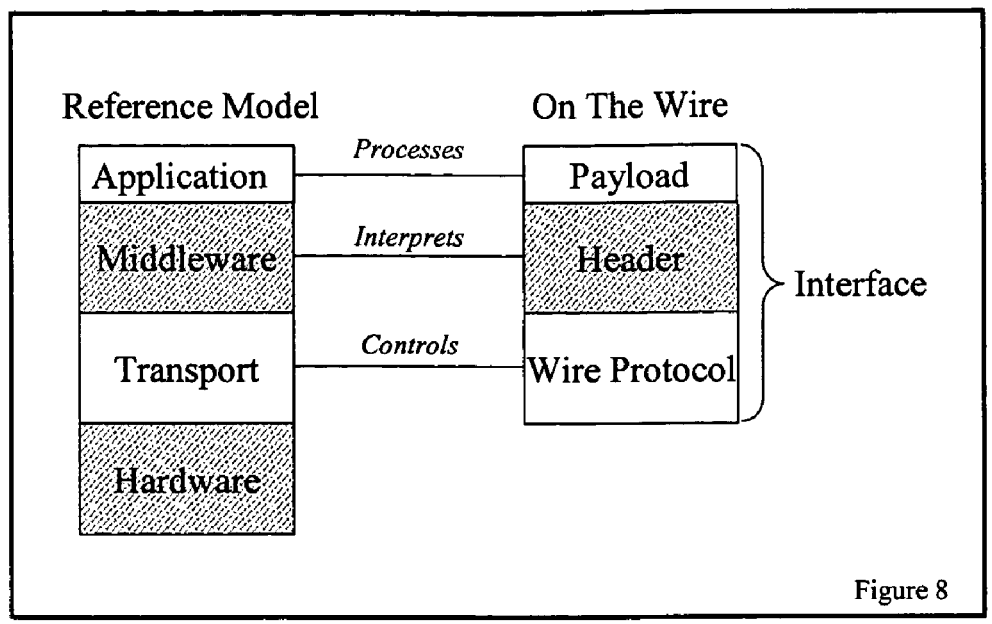
FIG. 8 is a diagrammatical view showing the relationship between the OSI reference model and a simplified reference model for application interaction.

In FIG. 7 there is illustrated a simplified reference model which is an abbreviated version of the ISO reference model. In the abbreviated model of FIG. 7, there are four layers, namely, a hardware layer which performs the functions of the link and physical layers of the ISO model, a transport layer which performs the functions of the transport and network layers of the ISO model, a middleware layer which performs the functions of the presentation and session layers of the ISO model and an application layer which is a counterpart of the application layer in the ISO model. As seen in FIG. 8, every message flowing over the wire reflects the structure of the top three layers of the reference model. The transport layer controls the wire protocol; the middleware layer interprets the header; and the application layer processes the payload.

Figure 16:
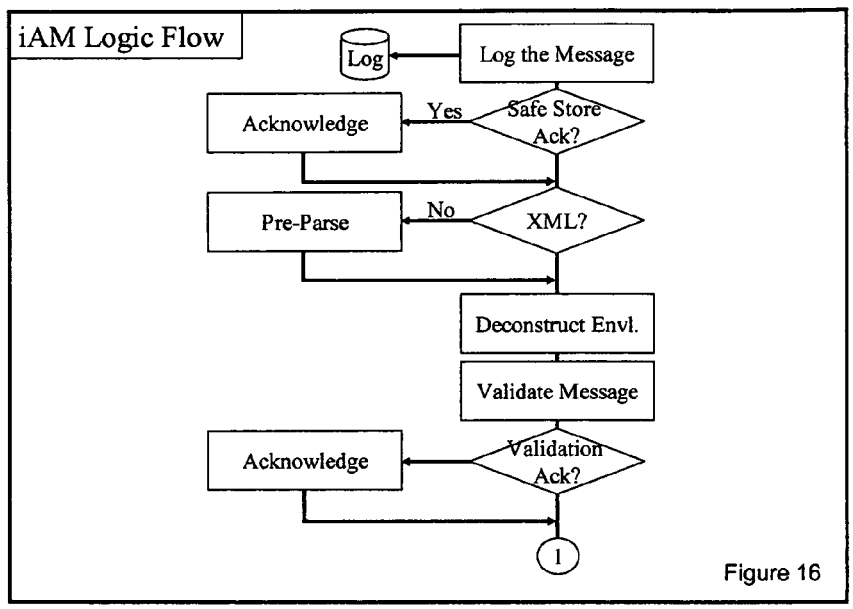
FIGS. 16 and 17, together, depict the logic flow of the adapter manager portion of the invention.
Figure 17:
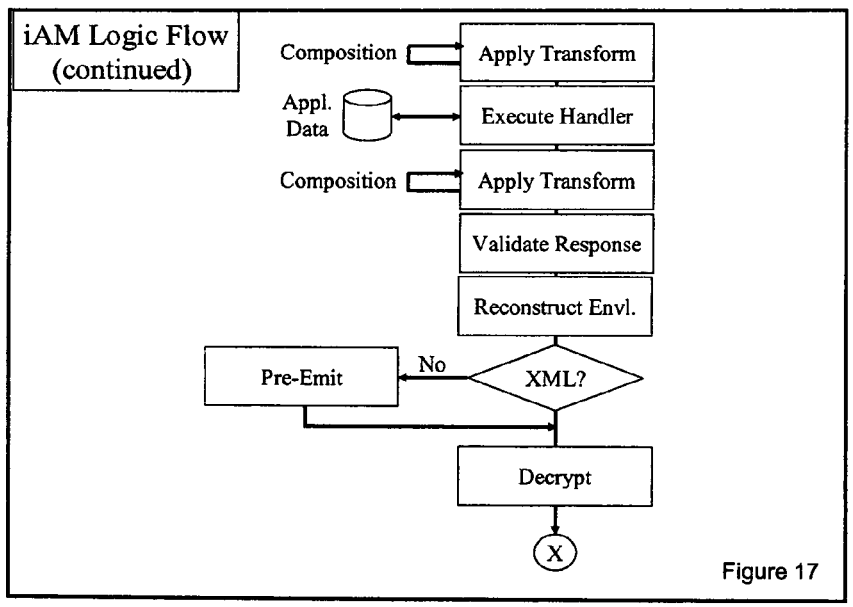
Figure 18:
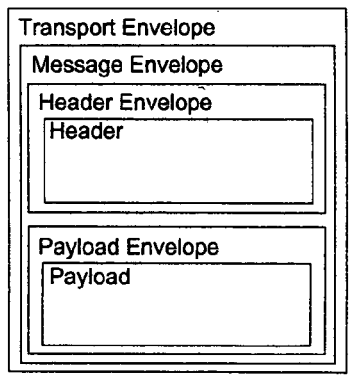
FIG. 18 is a diagram showing the structure of an industry standard type of message known as an ebXML message.

The adapter manager (AM) component (see FIG. 16 and its continuation, FIG. 17) provides a run-time environment for configurable adapters. The XD adapter handler component is a concrete UAF implementation for the AM environment. By mapping the relevant interfaces to a handler or a pre-parser, the adapter handler component makes it possible for UAF adapters to run in the AM. The shim framework is a framework for creating a shim. The shim framework expresses the software rules, e.g., JAVA™ declarations, for creating a shim. A shim is a mechanism for transforming a configured AM into a UAF adapter that can subsequently be deployed to any concrete implementation of the UAF, including the AM. A shim serves as an enabler. It converts an instance of an AM into an adapter that may be combined, via composition, with other adapters.

An interface creation procedure (FIG. 13) converts a conforming JAVA™ program (one that implements the required UAF interfaces) and a set of conforming XML documents into an interface that developers can use at design-time to generate metadata, and at run-time, to implement an event or a service request. The adapter configuration procedure (FIG. 14) enables developers to construct adapters from such off-the-shelf component parts as listeners, pre-parsers and handlers.

A listener is an active process or thread of execution that monitors a communications port for incoming messages of a given type. Listeners provide a mechanism for granting connections to a server.

A pre-parser is a computer program that transforms a document encoded in some other standard into a predetermined preferred language, e.g., XML. In accordance with the UAF of the invention, pre-parsers set the stage for XML or other predetermined language parsing to occur.

A third procedure, adapter deployment (FIG. 15), provides for loading adapters into any compatibly packaged concrete implementation of the UAF. Dictionaries containing metadata catalogs of the capabilities of each adapter are consulted for creating metadata design descriptions for each adapter to be deployed.

The UAF accommodates every computer platform, every commercially viable transport protocol and every commonly used message format. While it imposes no restrictions on application systems or the environments in which such systems operate, it does impose the following important structural restrictions on the adapters that run under its control.

A conforming adapter must provide a set of services that allow the introspection of metadata and the publication of request/response schemas.

Figure 6:
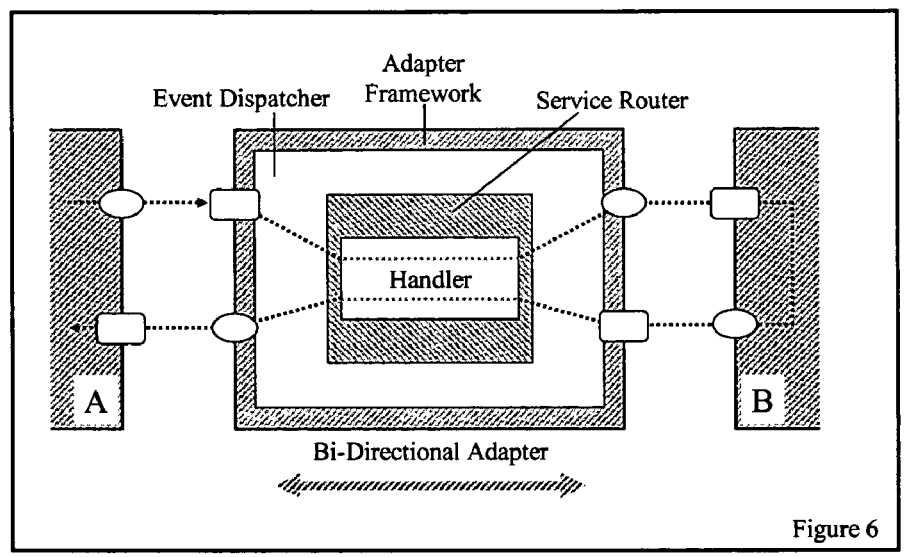
FIG. 6 is a detailed diagrammatical view of an adapter built in accordance with the invention.

A conforming adapter (see FIG. 6) consists of three required components, namely, an event dispatcher, a service router and a handler.

A conforming adapter must be capable of managing its lifecycle (i.e., installation, configuration, deletion, reparation, start, stop, etc.).

A conforming adapter must provide two interfaces, one for handling incoming requests and another for invoking services.

Event dispatchers field incoming request messages and hand them off to service routers. Service routers deconstruct the messages, i.e., analyze their envelopes to see how the messages are constructed, cast them in a common internal representation (IR) and pass them to handlers. Handlers are computer programs that conform to various UAF rules and conventions. In theory, they can perform any other computer function, but they must be capable of interpreting messages cast in a common internal representation and interacting intelligently with the clients and servers that depend on them. Service routers enable handlers to direct requests to external systems and to receive their responses without having to deal with low-level technical details.

After receiving an outgoing request from a handler, the service router addresses it and sends it over the wire. When an event dispatcher receives a response from a target application, it passes it to the service router which converts the response into a message cast in a common internal representation for the benefit of the handler. The handler manipulates the resulting structure, as required, and passes an altered structure back to the event dispatcher. Finally, the event dispatcher transforms the structure into a message format compatible with the targeted application.

The actions of the service router, all of which are invoked automatically, are dictated by metadata. Metadata enables the service router, for example, to transform incoming messages automatically and to assign a suitable handler to every message that flows through the system. Metadata also enables the service router to associate the appropriate format and the correct destination with every outgoing message.

Figure 9:
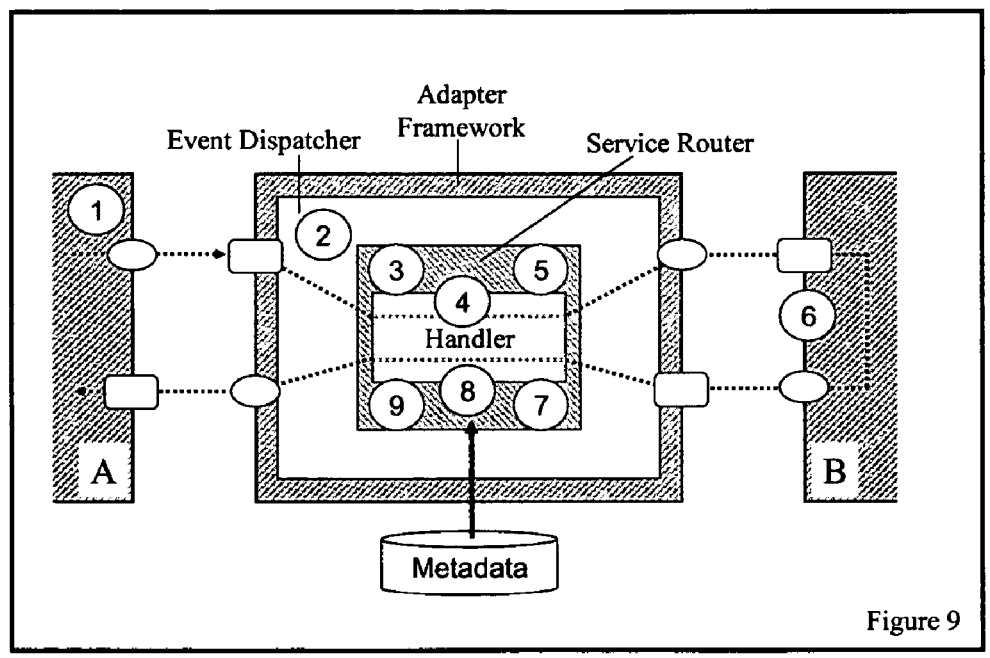
FIG. 9 is a schematic diagram depicting the workings of an adapter constructed in accordance with the invention.

FIG. 9 schematically describes the steps a UAF adapter takes when it mediates between two applications, A and B. In step (1), application A formulates a request message (M) and transmits it to the adapter framework. There, the event dispatcher (step 2) receives M and hands it to the service router. The service router (step 3) converts request message M to a message M' having a common internal representation and consults a local metadata repository.

The event dispatcher invokes a handler after pairing the message M' with a metadata entry that specifies which handler to apply. The handler (step 4) converts message M' into a message M" having a form compatible with application B. This process may entail enriching, validating and transforming data.

Having completed its manipulations, the handler determines how to route the message and yields control to the service router. The service router (step 5) transmits message M" to application B and (in step 6) application B processes the request. The response R to the request flows back to the event dispatcher and then to the service router. The service router (step 7) then re-engages the handler. In step (8), the handler reformats the response to a response R' and passes response R' to the service router. Finally (step 9), the service router converts response R' into a format compatible with application A, and transmits it to application A.

In accordance with the invention, adapters share more than a common structure; they share many of the same parts as well because the architecture of the framework is conducive to software re-use.

The UAF has a central core supplemented by an expanding array of specialized components including parsers, pre-parsers, pre-emitters, communications modules, transformation engines, developer-friendly interactive tools and other building blocks that surround the core. The core ties these design-time building blocks together and enables the framework to expand and evolve.

In another sense, the core connects run-time building blocks and adapters together, making it possible for developers to construct intra-enterprise and inter-enterprise systems of unprecedented size.

The coarse-grained run-time building blocks in the UAF software re-use scenario are the adapters themselves. The process of composition makes it possible to create a new adapter by linking two or more existing adapters together serially. As mentioned above, adapter composition is known in the prior art.

The UAF of the present invention improves upon the prior art by supporting architectural recursion, which makes the process of composition immeasurably more useful. Architectural Recursion is a form of composition in which an adapter invokes its containing adapter as an intermediary. Architectural recursion is invaluable because it opens up an avenue for software re-use that is not available in any other context.

Figure 10:
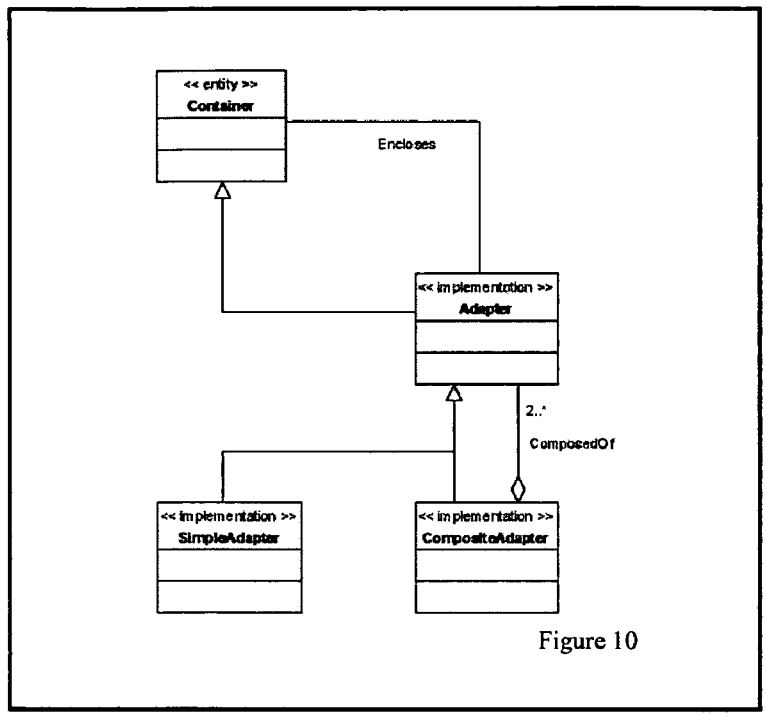
FIG. 10 is a Unified Modeling Language (UML) diagram depicting the architecture of simple and compound adapters.

Every UAF adapter is a container, that is, a type of component that provides an execution context for an unspecified number of other components. Thus, within the UAF, an adapter A, can contain a second adapter B and adapter B, via composition, can invoke adapter A. The resulting compound adapter BA is recursive in the sense that one container, adapter B, invokes the adapter that is functioning as its container. A Unified Modeling Language (UML) diagram (FIG. 10) depicts the architectural structure that makes this form of recursion possible.

Architectural recursion is one feature of the UAF that has no counterpart in the prior art. Other features unique to the UAF of the invention include the following.

UAF adapters can provide two interfaces, one for incoming requests, another for outgoing requests (see FIG. 1).

UAF adapter interfaces are always bi-directional.

An UAF adapter interface can be either synchronous or asynchronous.

UAF makes it possible for communications transports to be configured independently of message payloads and headers.

Under UAF, request acknowledgements are independently configurable.

Under UAF, input and output message formats are independently configurable.

The UAF framework can be deployed to any server.

While the IWAY™ Universal Adapter Framework could, in principal, operate on any commercially viable computer platform, it was conceived and developed for the J2EE™ platform [1, 2]. J2EE™ offers many advantages from an enterprise application integration standpoint, not the least of which is its ability to "run anywhere."

EXAMPLE

The following is an example of a project in which an adapter is constructed in accordance with the invention using iWay software in a JAVA™ environment. iWay is a registered trademark of Information Builders, Inc., the provider of the iWay software. JAVA™ is a trademark of Sun Microsystems, Inc. The iWay software and JAVA™ environment are included by way of example only. The method of the invention is not limited to any particular software or environment and may be executed with other softwares and environments as will be appreciated by those skilled in the art.

The method of the example includes the steps of 1) creating directories for the project (DirectorySetup), 2) setting up a script for creating the code from which the adapter will be constructed, 3) creating support files for the project, 4) creating implementation classes, 5) building the project, and 6) running the adapter. Debugging is often necessary but is not a part of the method of the invention.

1) Creating Directories for the Project (Directorysetup)

First a directory for storing the programming code for the project is created. The directory structure as follows.

iwmyproject
    iwmyproject/src where myproject is the name of the adapter to be constructed.

The src subdirectory should match the JAVA™ package name and should follow the software naming convention which, in the case of iWay software would be com.ibi.iw-projectname Next, create the package directory /iwmyproject/src/com/ibi/iwmyproject.

This project constructs an independent adapter which relies on other projects and sources to function. The global structure of this project should exist in the following form.

```
/root
/root/components
/root/components/
/root/components/adapters
/root/components/adapters/myproject
```

The project relies on libraries to be compiled and will generate a jar when successful. The depending libraries and generated library will be found in /root/components/lib 2) Setting Up a Script for Creating the Code from which the Adapter Will be Constructed iWay adapters and relying projects are built with ant, which is similar to make. The project requires a build.xml to work with ant, a JAVA™ based software build tool which builds all iWay code several times daily once the code is checked. Ant is available from The Apache Software Foundation.

Ant, including ant executable, should be installed on the system in use, e.g., in C:\somedirectory\apache-ant-VER†bin, in the path of the project.

The build file should reside in the root of the project directory. Hence, the example build should be placed in iwmyproject directory.

The example build file, /iwmyproject/build.xml, should be modified as follows for the project.

1) Name your Project

On the top line of the build.xml file the code

```
<project name="iwmyproject"     default="current"
basedir=".">
Should be modified to accurately reflect the project name,
for example
    <project name="iwfile"default="current" basedir=".">
```

Once this step is completed the project can build and generate a jar file. ant should be run from the project directory. The progress of the build will be displayed on the computer monitor as follows.

```
[edarab@edarab3 iwmyproject]$ ant
Buildfile: build.xml
compile:
[mkdir] Created dir:
/mnt/laptop/components/adapters/iwmyproject/classes
jar:
[mkdir] Created dir:
/mnt/laptop/components/adapters/iwmyproject/classes/meta-inf
[jar] Building jar:
/mnt/laptop/components/lib/iwmyproject.jar
current:
BUILD SUCCESSFUL
Total time: 3 seconds
[edarab@edarab3 iwmyproject]$
```

In this example two different types of adapters are created, viz., one for sending data and one for receiving data. The "activation" of each in the iWay container is controlled by data in the manifest which is specified in the project in build.xml. The following code from the build.xml activates the outgoing adapter.

```
<section
name="com/ibi/${ant.project.name}/MyProjectServiceOutbound.
class">
<attribute name="iXTE-emitter" value="true"/>
<attribute name="Design-time" value="true"/>
</section>
```

To support inbound or listening adapters, the following section of xml is used to notify the container that an inbound adapter is present and should be made available.

```
<section
name="com/ibi/${ant.project.name}/MyProjectServiceInbound.class">
<attribute name="iXTE-listener" value="true"/>
</section>
```

3) Creating Support Files for the Project

The adapter requires resources found in source files for its configuration and communication with the container. Four categories of support files are required. All support files should reside in the final package of the source directory, i.e., iwmyproject/src/com/ibi/iwmyproject.

The following files are necessary.

1) LocalStrings.Properties—To support container interaction throughout various locales 2) Descriptor.xml—Defines the initial parameters necessary to create the adapter.

3) Design.xml—Defines the logical structure of the adapter and the kinds of services it can provide.

4) Schemas—Define the structure of the documents that will be processed by the adapter.

1) The Local File—LocalStrings.Properties

The LocalStrings.properties file allows the adapter to generate messages and other information about the adapter in the native language of the machine it is running on. The required minimum fields are:

adapter_name=iwMyAdapter
adapter_version=.9a

The LocalStrings.properties is copied to the package source directory. The values are modified to suit the adapter. Values in descriptor.xml will later require a corresponding value to be present in the LocalStrings.properties file in order for the adapter to function properly.

2) The Descriptor File—Descriptor.xml

The descriptor.xml file is used to question the user for the values necessary to initialize the adapter. A complete schema for the descriptor is included in the Appendix under the heading "descriptor.xsd".

The descriptor uses key names which must be present in the locale file as follows.

```
<descriptor>
<option title="messageTitle">
<group title="standard">
<param name="directory" required="true" label="label"
type="string"
description="description" default="c:\outgoing"/>
</group>
</option>
</descriptor>
```

The corresponding values in the LocalStrings.properties for the present example are option.messageTitle=MyAdapter Service
group. standard=Standard
param.directory.label=Directory The descriptor.xml is copies to the package source directory.

3) The Design File—Design.xml

The design.xml file is used to define the adapter as a visual service during configuration of the graphical user interface. In the present example, a service adapter is being created. The design file has the following form.

```
<root version="2.2">
<design name="iwMyproject Service" description="Send
documents to a File System">
<service
description = "Send documents to a Filesystem"
name = "File Service"
request = "/com/ibi/iwmyproject/myproject_service"
requestRoot = "myproject"
response = "/com/ibi/iwmyproject/myproject_resp_service"
responseRoot = "emitStatus"
/>
</design>
</root>
```

Both request and response attributes point to specific schemas to be added. However the ".xsd" portion of the name is left off. The container will let other services know what the desired schemas and root xml tag are for incoming and outgoing documents. The adapter does not decide whether these values are enforced. Tools for validating schemas are available and are not part of the invention. The design.xml file is copied to the package source directory.

4) Schemas—Schema Files

The schema files are used to tell other systems integrating with the adapter what kind of xml formatting is expected and what is valid. The schema files are defined in the design file. For the present example there are three schema files as follows.

1) iwproject_service.xsd
2) iwproject_event.xsd
3) iwproject_resp_service.xsd

The above schema files are placed in the package source directory and will be automatically recognized by the container once they have been defined in design.xml. Defined names in design.xml follow the package naming convention with slashes (not dots) and do not contain the .xsd portion of the filename. The schema files are copied to the package source directory.

4) Creating Implementation Classes

Any adapter is required to support either inbound functionality or outbound functionality. The adapter under construction will support both inbound and outbound functionality. Most outbound adapters support moving a particular received document to a subsequent system such as CICS, MQSeries, or Database. An inbound adapter is a listener to any of the following systems.

1) Common
2) Outbound
3) Inbound

Both inbound and outbound adapters share several methods for their interaction obtained from the external container. The following methods relate to the lifecycle of the adapter which is initialized (activate), and then shut down (passivate). During its life cycle the adapter may process n documents. The following methods need to be completed with code in order to enable each adapter.

```
public void activate(Map parameters) throws
IllegalStateException{
super.activate(parameters);
directoryDir=(String)parameters.get("directory");
}
```

For outbound adapters, the call to super.activate(parameters) is required to provide the superclass with the map which it will use to provide the container with the necessary design information from the adapter.

The following code retrieves configuration information where directoryDir is a predefined variable and "directory" is defined in the design.xml.
directoryDir=(String)parameters.get("directory")

The following passivate code serves to provide an opportunity to appropriately close any connections or other resources which the adapter may have created during its initialization or processing.

```
void passivate( ) {
//close resources
}
```

By extending both adapters from the provided utilities ExtendableAdapter and ExtendableBase, several utilities are available to the adapter whose uses are present in the example such as:
Logging
available via the logger object.
LocaleStringManager
available via the lsm object.

2) Outbound

The requirement for outbound adapters is implementation of the IAdapterinterface. this example extends ExtendableAdapter which simplifies the use of schema, locale, descriptor, and other files and configurations of the adapter. Aside from the common methods to be implemented, the only other method to be implemented in the present example outbound adapter is process, listed below.

```
public void process(IDocument in, IDocument out, IContext
iContext)
throws AdapterException {
String filename=System.currentTimeMillis( )+".xml";
File             myNewFile=new
File(directoryDir+File.separator+filename);
try{
FileOutputStream fout=new FileOutputStream(myNewFile);
fout.write(in.getRootXML( ).getBytes( ));
fout.close( );
out.setRootXML(""+directoryDir+File.separator+filename+"");
}catch(IOException e){
out.setRootXML(""+e.getMessage( )+"");
throw new AdapterException("Error Occurred Processing
Document:"
+e.getMessage( ),AdapterException.SERVER);
}
}
```

Here the adapter receives a document and writes it to the directory for which the adapter is configured.

3) Inbound

This example makes use of a thread to continually check a directory for files present. This is optional as many protocol listeners do not require a thread. Ideally this can ignored. The inbound adapter has specific methods to add and remove listeners to traffic on the particular adapter's protocol. These methods are provided by extending ExtendableInbound. In this particular example, the following Arraylist supports the methods. Note, this code is provided via superclass and does not need to be implemented if extending ExtendableInbound.

```
List listeners=new ArrayList( );
public void  addInboundEventListener(IInboundEventListener
l)
throws IllegalStateException {
listeners.add(l);
}
public                             void
removeInboundEventListener(IInboundEventListener l)
throws IllegalStateException {
listeners.remove(l);
}
```

The next step is to create a supporting class MessageEvent which extends InboundEvent. The following code section shows how MessageEvent is populated the moment the adapter is notified by a protocol. This is the only section which needs to be implemented if extending ExtendableInbound.
IDocument doc=UtilsFactory.INSTANCE.build
  Document( );
String xData=this.readFile(list[i]);
MessageEvent event=new MessageEvent(this,doc);
sendToAll(event);

Following is the sendToAll, which makes use of the List maintained by the adapter, which sends an event to all registered listeners and is provided in ExtendableInbound.

```
private void sendToAll(MessageEvent ev){
Iterator i=listeners.iterator( );
while(i.hasNext( )){
IInboundEventListener l=(IInboundEventListener)i.next( );
l.onMessage(ev);
}
}
```

The MyProjectServiceInbound and MessageEvent are copied to the package directory.

5) Building the Project

The adapter is built by running ant from the project directory as follows.

The progress of the build will be displayed on the computer monitor as follows.

```
C:\xfoc2\components\adapters\iwmyproject>ant
Buildfile: build.xml
compile:
[mkdir]          Created           dir:
C:\xfoc2\components\adapters\iwmyproject\classes
[javac] Compiling 3 source files to
C:\xfoc2\components\adapters\iwmyproject
\classes
jar:
[mkdir]          Created           dir:
C:\xfoc2\components\adapters\iwmyproject\classes\meta-i
nf
[copy]      Copying      6      files       to
C:\xfoc2\components\adapters\iwmyproject\classes\
com\ibi\iwmyproject
```

-continued

```
[jar] Building jar: C:\xfoc2\components\lib\iwmyproject.jar
current:
BUILD SUCCESSFUL
Total time: 3 seconds
C:\xfoc2\components\adapters\iwmyproject>
```

Running the Adapter

The jar can now be run in an iWay container such as jca or ibse. Testing for both is complemented by installation of the iXTE engine which is necessary in testing of the iBSE. Both tests require the latest iWay application windows explorer which is readily available.

By running the iwae from the command line using ae.bat, debugging will be easier.

1) JCA—Outbound, Inbound, Debugging
2) ibse—Outbound, Inbound, Debugging

Running in JCA

Outbound

1) Copy the iwmyproject jar from lib to IXTE_HOME/lib
2) Right click on "iWay Configurations" and select "new"
3) Name the configuration "myJCATest"
4) Change the drop down selection to JCA
5) Enter the components dir C:\IWAY_HOME (the application explorer will append lib to find the jar)
6) Select "OK"
7) Right click on the new configuration, and select "connect"
8) Select "iWay Adapters"
9) From the list, right click "iwmyservice" and select "Add target"
10) Give the service a name and brief description.
11) When prompted for a directory, change the default to "c:\outgoing" or similar. Then select "OK"
12) A new node should be available. Right click and select "connect".
13) The adapter is valid. The process functionality for JCA needs to be tested in a separate container Inbound 1) Follow the steps above for creating a new configuration
2) Select "iWay Events"
3) Right click Ports, and select "Add Port"
4) Provide a name and description Although this example has its own file, push the event to another file.

5) From the drop down select "File"
6) in the url enter file://c:\eventtest\
7) create the eventtest directory on the c:\\ drive
8) Go back to tree view
9) Right click channels and select "Add Channel"
10) Provide a name and description
11) Protocol should be set to myProject Listener (as specified in build.xml)
12) Under available ports, the previous port created should be moved over to selected ports.
13) Select "Next"
14) Enter an existing directory. This is the dialog from the descriptor.xml
15) Select "OK"
16) A new node should appear with an X through it
17) Right click the new node and select "Start"
18) Copy an xml file to the directory provided to the adapter. The xml file should appear in the directory provided by the port.

Debugging Options

When testing the jca, a log can be found relative the configuration directory, c:\myconfigDir\nameofconfig\log which will contain a log of any errors. To set the level of debug place the jcatransport.properties in the specific config directory as follows.

c:\myconfigDir\nameofconfig\jcatransport.properties

This version of the jcatransport.properties file is set to debug. Additional debugging information can be found by running the swing explorer from the command line and executing ae.bat (or ae.sh on UNIX).

Running in iBSE

Outbound

1) Copy the iwmyproject jar from lib to IXTE_HOME/lib
2) Right click on "iWay Configurations" and select new
3) Name the configuration "myiBSETest"
4) Change the drop down selection to iBSE
5) Change the URL to http://localhost:9000/
6) Select "OK"
7) Right click on the new configuration, and select "connect"
8) Select "iWay Adapters"
9) From the list, right click "iwmyservice" and select "Add target"
10) Give your service a name and brief description and select
11) Prompted for a directory, change the default to "c:\outgoing" or similar, select "OK"
12) A new node should be available, right click and select "connect"
13) The node is now functioning, but needs to be made available via webservice
14) Expand the adapter node fully and right click. Select "Create an iWay Business Service."
15) Select New Service from the drop down. Name the new service "ibseTest". Select "Next".
16) Name the service "myAdapterService", select "OK". The business service automatically expands.
17) Point the browser to the webservice http://localhost:9000/production/ibseTest.ibs?op=myAdapterService. Enter some xml data into the browser field.

```
<test>
Zombie movies are great
</test>
Select "Invoke"
```

18) Check the selected directory for a new document. Presence of the document confirms adapter functionality.

Inbound

See above (2-7) for connecting to the ibse.

See JCA Inbound (2-18) for adding and testing the channel.

Debugging Options

When testing the ibse, there is a likelihood of finding errors in the iXTE console and the iXTE log.

TroubleShooting

1) Cannot find message associated with key "param.whatever.again"
2) When adding ibse channel, "Error processing request [SETCHANNELINFO]-[lclassname] is a NOT NULL field"

Cannot find message associated with key "param.whatever.again"

This message occurs when there is a mismatch between the descriptor.xml file and the LocalStrings file. Check the descriptor to check that each parameter is exactly defined, including with respect to case, and check to see if it is in the localstrings file. It may be also be that the LocalString file is not being found; check the jar and make sure it is present and in the correct directory with all the other supporting files.

Error processing request[SETCHANNELINFO]-[lclassname] is a NOT NULL field

The adapter name in the LocalStrings file and the name of the project in the build.xml must match. To override the displayname, change to the desired name in the LocalStrings file and override the name (which is set to use the project name) in the manifest section of the build.xml.

What is claimed is:

1. A method of producing adapters capable of enabling a first application to obtain information from and provide services to an incompatible second application and for enabling said second application to obtain information from and provide services to said first application, comprising
providing a framework of software resources and rules governing the use of said software resources for the purpose of integrating said first application and said second application,
providing a procedure for configuring from said rules and objects in said framework, an adapter to mediate between said first application and said second application,
providing a procedure for creating a first interface for said adapter for enabling said adapter to receive requests from said first application and to relay said requests in another form to said second application, and
providing a procedure for creating a second interface for said adapter for enabling said adapter to receive requests from said second application and to relay said requests to said first application in another form,
whereby requests for information issued from said first application to said second application are converted by said adapter into a form compatible with said second application, and then transmitted to said second application,
replies from said second application to said requests issued from said first application to said second application are converted by said adapter into a form compatible with said first application and then transmitted to said first application,
service requests issued from said second application to said first application are converted by said adapter into a form compatible with said first application and then transmitted to said first application, and
replies from said first application to said service requests issued from said second application to said first application are converted by said adapter into a form compatible with said second application and then transmitted to said second application.

2. A method according to claim 1 wherein creation of said first and second interfaces comprises the steps of
creating a software connection specification relating said first application to said second application,
deriving from said framework, a design-time specification comprising a software description of the function of said adapter,
deriving from said framework a run-time interaction specification for governing the response of said adapter to a message received from a computer system,
constructing an adapter capable of responding to an incoming message event, and
enabling said adapter to respond to a service or a transaction.

3. A method according to claim 1 wherein configuration of said adapter comprises the steps of
deriving a listener from said framework for monitoring messages received from said first application or said second application,
determining whether each message received by said listener is in a predetermined preferred language,
for each message which is not in said predetermined preferred language, determining whether said message is in one of a group of other predetermined languages, and, it so, configuring a pre-parser for converting said message to said predetermined preferred language, and if not, transmitting said message without conversion.

4. A method in accordance with claim 3 further comprising determining a destination for a reply message when generated in response to a request.

5. A method in accordance with claim 3 further comprising determining a destination for an error message when generated in response to said message.

6. A method in accordance with claim 3 further comprising selecting from said framework, an adapter manager as a container for said adapter as a function of said first application and said second application.

7. A method in accordance with claim 3 further comprising deploying said adapter over a computer network.

8. A method in accordance with claim 7 further comprising,
for each message arrival event, creating a corresponding event dictionary template and an event parameter description,
for each occurrence of a service, creating a service dictionary template and a service parameter description,
creating a metadata design description for each event from said event dictionary template and said event parameter description,
and creating a metadata design description for each service from said service dictionary template and said service parameter description, and
creating a shim archive in response to said metadata design description.

9. A method according to claim 1 wherein said adapter comprises,
an event dispatcher for responding to external events initiated by said one of said first application and said second application and assigning incoming messages from said one of said first application and said second application for subsequent processing,
a service router for formulating and supervising the implementation of a plan of action for processing each of said incoming messages, and
a handler for manipulating said incoming messages in accordance with said plan of action in order to make said incoming messages understandable to said other of said components.

10. A method of producing an adapter in order to enable a first application to obtain services from and provide services to an incompatible second application, and for enabling a said second application to obtain services from and provide services to said first application, comprising the steps of:
providing a framework for storing and providing software resources and rules governing said first application and said second application, and software objects,
providing a first interface for said adapter for enabling said adapter to receive requests from said first application and to reply to said first application, and providing a second interface for enabling said adapter to receive requests from said second application and to reply to said second application, whereby requests for services issued from said first application to said second application are converted by said adapter into a form compatible with said second application and then transmitted to said second application, replies by said second application to said requests for services from said first application to said second application are converted by said adapter into a form compatible with said first application and then transmitted to said first application, service requests issued from said second application to said first application are converted by said adapter into a form compatible with said first application and then transmitted to said first application, and replies from said first application to said service requests issued from said second application to said first application are converted by said adapter into a form compatible with said second application and then transmitted to said second application.

11. A method in accordance with claim 10 further comprising providing an adapter manager, said adapter manager serving as a container for said adapter.

12. A method in accordance with claim 10 wherein said adapter comprises,
- an event dispatcher for responding to external events initiated by one of said first appication and said second application and assigning incoming messages from either of said first appication and said second application for subsequent processing,
- a service router for formulating and supervising the implementation of a plan of action for said incoming messages, and
- a handler for manipulating said incoming messages in accordance with said plan of action in order to make said incoming messages understandable to message recipients.

13. A method in accordance with claim 10 wherein the adapter configured from said framework is a one-way adapter.

14. A method in accordance with claim 10 wherein the adapter configured from said framework is a round-trip adapter.

15. A method in accordance with claim 10 wherein the adapter configured from said framework is a bi-directional adapter.

16. A method in accordance with claim 10 wherein said framework provides a run-time environment for a multiplicity of adaptors executing simultaneously.

17. A method in accordance with claim 10 wherein said framework provides resources and rules supporting event-driven component interactions.

18. A method in accordance with claim 10 wherein said framework enables each application in a computer system to run in cooperation with another incompatible application.

19. A method in accordance with claim 10 wherein said framework employs metadata means for controlling internal decision-making processes.

20. A method in accordance with claim 10 wherein said framework provides metadata means for managing message routing and control.

21. A method in accordance with claim 10 wherein said framework provides resources and rules for adapter composition.

22. A method in accordance with claim 10 wherein said framework provides resources and rules for architectural recursion.

23. A method in accordance with claim 10 wherein said framework requires each individual adapter within its purview to be partitioned into re-usable event dispatchers, service routers and handlers.

24. A method in accordance with claim 10 wherein said framework provides general-purpose means for text reformatting and transformation.

25. A method in accordance with claim 10 wherein said framework requires all adapters within its purview to supply metadata by introspection.

26. A method in accordance with claim 10 wherein said adapters are application adapters.

27. A method in accordance with claim 10 wherein said adapters are data adapters.

28. A method in accordance with claim 10 wherein said adapters provide transactional compatibility.

29. A method in accordance with claim 10 wherein said adapters are secure adapters.

30. A method in accordance with claim 10 wherein said framework comprises resources and rules for supporting a multiplicity of security protocols.

31. A method in accordance with claim 10 wherein said framework comprises resources and rules for supporting synchronous interactions between cooperating components.

32. A method in accordance with claim 10 wherein said framework comprises resources and rules for supporting asynchronous interactions between cooperating components.

33. A method in accordance with claim 10 wherein said framework comprises resources and rules for configuring communications protocols independently of message header and payload content.

34. A method in accordance with claim 10 wherein said framework comprises resources and rules for independently configuring communications acknowledgements.

35. A method in accordance with claim 10 wherein said framework comprises resources and rules for configuring input message formats.

36. A method in accordance with claim 10 wherein said framework comprises resources and rules for configuring output message formats.

37. A method in accordance with claim 10 wherein said framework can be deployed to any server.

* * * * *